United States Patent
Nishida (10) Patent No.: US 8,583,317 B2
(45) Date of Patent: Nov. 12, 2013

(54) IN-VEHICLE DEVICE, VEHICLE AUTHENTICATION SYSTEM AND DATA COMMUNICATION METHOD

(75) Inventor: Junichi Nishida, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/276,462

(22) Filed: Oct. 19, 2011

(65) Prior Publication Data

US 2012/0095642 A1    Apr. 19, 2012

(30) Foreign Application Priority Data

Oct. 19, 2010 (JP) ................................ 2010-234702

(51) Int. Cl.
  *G06F 7/00*     (2006.01)
  *H04L 9/32*     (2006.01)
  *H04W 12/06*    (2009.01)
(52) U.S. Cl.
  USPC ........ 701/31.4; 701/31.5; 701/33.2; 701/29.6
(58) Field of Classification Search
  USPC .............................. 701/31.4, 31.5, 33.2, 29.6
  See application file for complete search history.

(56) References Cited

U.S. PATENT DOCUMENTS 6,429,773 B1 *  8/2002  Schuyler .................... 340/425.5

FOREIGN PATENT DOCUMENTS

JP            123059 A *  4/2009
JP       2009-123059 A    6/2009

* cited by examiner

*Primary Examiner* — Mary Cheung
*Assistant Examiner* — Brian P Sweeney
(74) *Attorney, Agent, or Firm* — Sughrue Mion, PLLC (57) ABSTRACT

An in-vehicle device includes a storage unit storing a PIN code and an in-vehicle device ID kept confidential for a user and registered one for each vehicle; a first authentication unit determining whether the in-vehicle device is allowed to be connected to a mobile terminal on the basis of a comparison of the PIN code; a second authentication unit requesting an in-vehicle device ID from the mobile terminal that has been connected through authentication performed by the first authentication unit and authenticating the mobile terminal by comparing the in-vehicle device ID transmitted from the mobile terminal in response to the request with the in-vehicle device ID registered in the in-vehicle device; and a data transmission unit transmitting predetermined vehicle data, obtained from a vehicle equipped with the in-vehicle device and indicating a vehicle state, to the mobile terminal that has been authenticated by the second authentication unit.

11 Claims, 5 Drawing Sheets

IN-VEHICLE DEVICE, VEHICLE AUTHENTICATION SYSTEM AND DATA COMMUNICATION METHOD

INCORPORATION BY REFERENCE

The disclosure of Japanese Patent Application No. 2010-234702 filed on Oct. 19, 2010 including the specification, drawings and abstract is incorporated herein by reference in its entirety.

BACKGROUND OF THE INVENTION

1. Field of the Invention

The invention relates to an in-vehicle device, a vehicle authentication system and a data communication method.

2. Description of Related Art

In a related art, there is known an authentication system that allows communication with a mobile terminal of which authentication based on first authentication information is successful and that performs authentication based on second authentication information after communication is allowed (for example, see Japanese Patent Application Publication No. 2009-123059 (JP-A-2009-123059)). A MAC address, a personal identification number (PIN) code or a fixed name corresponding to a mobile terminal (the name of a mobile terminal, which may be set by a user) is used as the first authentication information. In addition, mobile terminal fixed information (authentication key) that is generated by the authentication system and that is acquired by a mobile terminal through registration process and stored in a storage unit is used as the second authentication information.

When an application that uses vehicle data indicating a vehicle state, obtained from a vehicle equipped with an in-vehicle device, is caused to run on a mobile terminal, the vehicle data needs to be transmitted from the in-vehicle device to the mobile terminal; however, it is important for transmission of vehicle data having a high level of security to a mobile terminal to undergo authentication procedure having an appropriate high level of security.

SUMMARY OF THE INVENTION

The invention provides an in-vehicle device, vehicle authentication system and data communication method that are able to achieve a high level of security.

A first aspect of the invention provides an in-vehicle device. The in-vehicle device that relays wireless data communication between an in-vehicle electronic device and a mobile terminal includes: a storage unit that stores a PIN code and an in-vehicle device ID that is kept confidential for a user and that is registered one for each vehicle; a first authentication unit that determines whether the in-vehicle device is allowed to be connected to a mobile terminal on the basis of a comparison of the PIN code; a second authentication unit that requests an in-vehicle device ID from the mobile terminal that has been connected through authentication performed by the first authentication unit and that authenticates the mobile terminal by comparing the in-vehicle device ID transmitted from the mobile terminal in response to the request with the in-vehicle device ID registered in the in-vehicle device; and a data transmission unit that transmits predetermined vehicle data, which is obtained from the in-vehicle electronic device and which indicates a vehicle state, to the mobile terminal that has been authenticated by the second authentication unit.

A second aspect of the invention provides a vehicle authentication system. The vehicle authentication system includes: the in-vehicle device according to the first aspect; the mobile terminal; and a data management device that manages the in-vehicle device ID and that is managed at a vehicle maker or a facility under management of the vehicle maker, wherein the data management device is communicable with the mobile terminal and transmits the in-vehicle device ID to the mobile terminal.

A third aspect of the invention provides a data communication method between an in-vehicle device and a mobile terminal, wherein the in-vehicle device stores a PIN code and an in-vehicle device ID that is kept confidential for a user and that is registered one for each vehicle. The method includes: in the in-vehicle device, determining whether the in-vehicle device is allowed to be connected to the mobile terminal on the basis of a comparison of the PIN code; in the in-vehicle device, requesting an in-vehicle device ID from the mobile terminal that has been connected through authentication based on a comparison of the PIN code; in the in-vehicle device, authenticating the mobile terminal by comparing the in-vehicle device ID transmitted from the mobile terminal in response to the request for the in-vehicle device ID with the in-vehicle device ID registered in the in-vehicle device; and, in the in-vehicle device, transmitting predetermined vehicle data, which is obtained from the vehicle equipped with the in-vehicle device and which indicates a vehicle state, to the mobile terminal that has been authenticated by a comparison of the in-vehicle device ID.

According to the above aspects of the invention, it is possible to provide an in-vehicle device, vehicle authentication system and data communication method that are able to achieve a high level of security.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
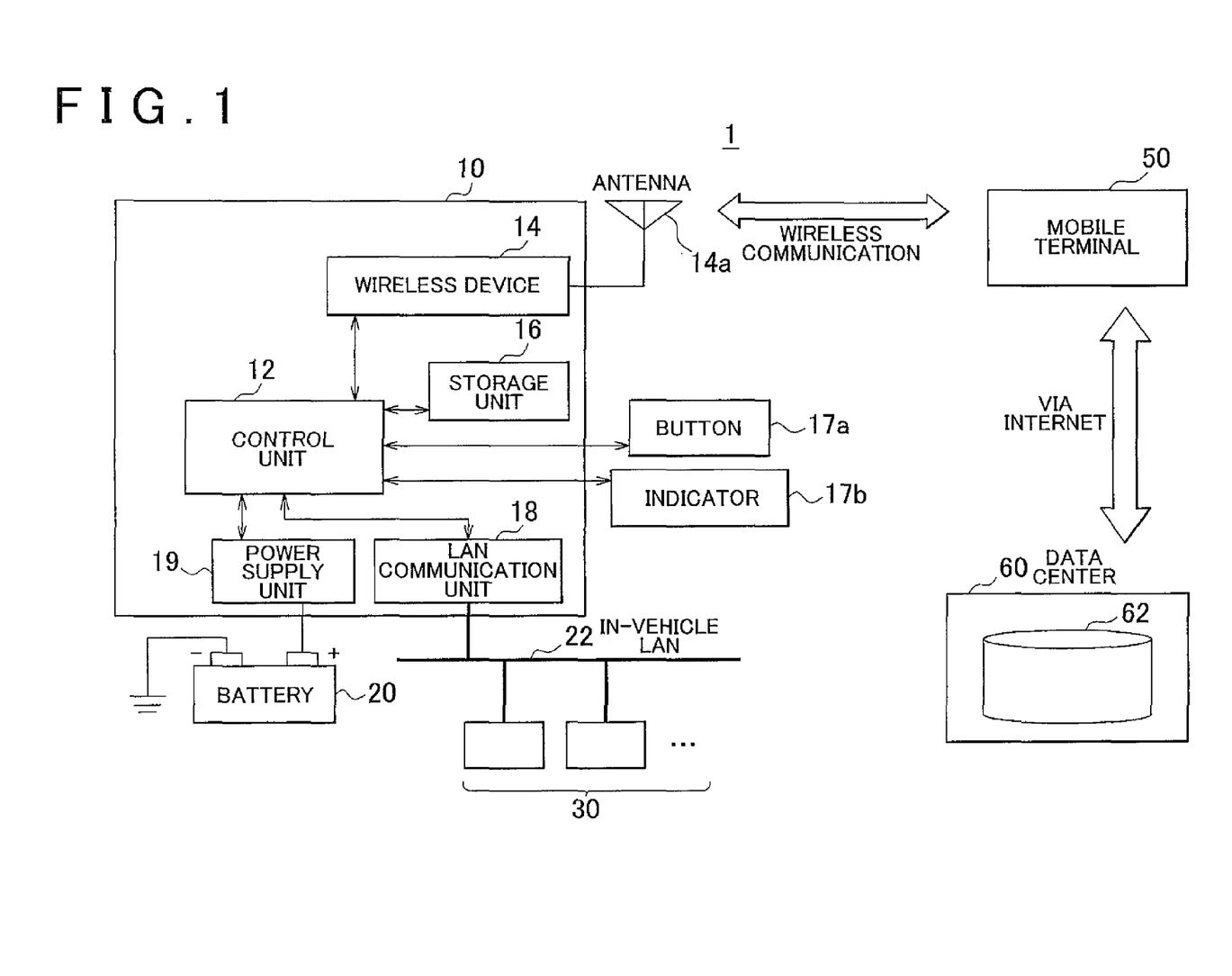
FIG. 1 is a configuration diagram that shows the schematic configuration of a vehicle authentication system according to an embodiment of the invention.
Figure 2:
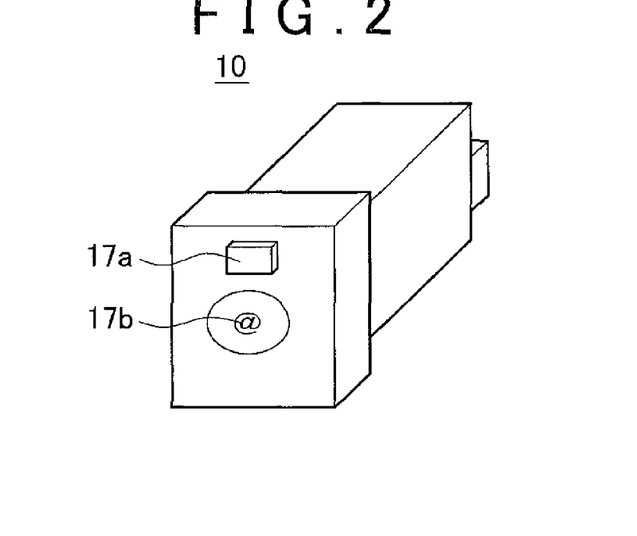
FIG. 2 is a perspective view that shows the appearance of an example of a discrete in-vehicle device.
Figure 3:
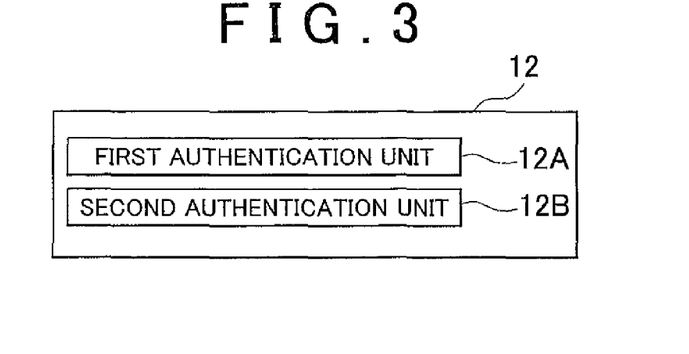
FIG. 3 is a view that shows major functional units of a control unit.
Figure 4:
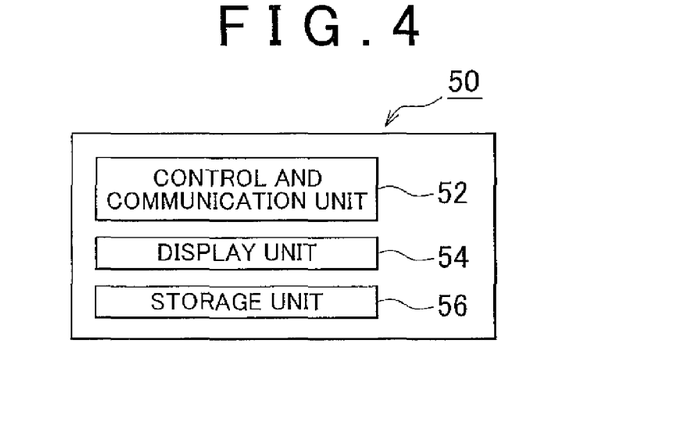
FIG. 4 is a view that shows major functional units of a mobile terminal.

FIG. 1 is a configuration diagram that shows the schematic configuration of a vehicle authentication system 1 according to the embodiment of the invention. FIG. 2 is a perspective view that shows an example of the appearance of an in-vehicle device 10. FIG. 3 is a view that shows major functional units of a control unit 12. FIG. 4 is a view that shows major functional units of a mobile terminal 50.

As shown in FIG. 1, the vehicle authentication system 1 includes the in-vehicle device 10, the mobile terminal 50 and a data center (server) 60. The in-vehicle device 10 and the mobile terminal 50 are able to carry out wireless communication with each other using a wireless technology such as Bluetooth (trademark). In addition, the mobile terminal 50 and the data center 60 are able to carry out communication with each other via a network such as the Internet.

As shown in FIG. 1, the in-vehicle device 10 includes the control unit 12, a wireless device 14 having an antenna 14a, a storage unit 16, a button 17a, an indicator 17b, a LAN communication unit 18 and a power supply unit 19. As will be described later, the in-vehicle device 10 functions as a gateway of communication between the mobile terminal 50 and various in-vehicle electronic devices (ECU, and the like) 30.

The control unit 12 is a microcomputer formed of a CPU, a ROM, a RAM, and the like, that are connected to one another via a bus (not shown). The ROM stores various programs to be executed by the CPU. The storage unit 16 is connected to the control unit 12. The storage unit 16 is typically formed of a recordable memory and may be formed of a rewritable memory, such as an EEPROM and a hard disk drive (HDD). The storage unit 16 stores a PIN code and an in-vehicle device ID (described later).

The control unit 12 includes a first authentication unit 12A and a second authentication unit 12B as major functional units. The functions of these units 12A and 12B may be implemented in such a manner that the CPU executes programs stored in the ROM. The functions of these units 12A and 12B will be described later with reference to FIG. 5 and FIG. 6.

The in-vehicle device 10 carries out wireless communication with the mobile terminal 50 via the wireless device 14. A wireless technology, such as Bluetooth (trademark), may be utilized for the wireless communication. In this embodiment, the description will be continued on the assumption that Bluetooth (trademark) is utilized. Various pieces of data required for authentication are exchanged between the in-vehicle device 10 and the mobile terminal 50. In addition, vehicle data (vehicle data that indicates a vehicle state), and the like, obtained from a vehicle equipped with the in-vehicle device 10 is transmitted from the in-vehicle device 10 to the mobile terminal 50.

The in-vehicle device 10 is connected to an in-vehicle battery via the power supply unit 19 and is supplied with electric power. In addition, the in-vehicle device 10 is connected to an in-vehicle LAN 22 via the LAN communication unit 18. The in-vehicle device 10 is able to carry out data communication with the various in-vehicle electronic devices (ECU, and the like) 30 connected to the in-vehicle LAN 22. The in-vehicle LAN 22 may be based on a controller area network (CAN), a local interconnect network (LIN), or the like. In addition, the in-vehicle LAN 22 may be formed of a plurality of in-vehicle LANs (for example, a LAN for power train system control and a LAN for body system control).

The button 17a is arranged at a position at which a user is able to operate the button 17a. The indicator 17b is arranged at a position at which the user is able to visually recognize the indicator 17b. For example, as shown in FIG. 2, the button 17a and the indicator 17b may be provided outside the housing of the in-vehicle device 10. In this case, the in-vehicle device 10 may be provided at an appropriate location in a vehicle cabin (for example, an instrument panel, a console box, or the like) in a state where the button 17a and the indicator 17b are exposed to the vehicle cabin. The control unit 12 receives an operation signal (on signal) that is generated when the button 17a is operated by the user. In addition, the control unit 12 controls the state of illumination of the indicator 17b.

The mobile terminal 50 is a terminal (for example, a smartphone) that is carried onto and used in the vehicle cabin, and has a wireless communication function. In this embodiment, the mobile terminal 50 has a wireless communication function according to Bluetooth (trademark). In addition, the mobile terminal 50 is able to access the Internet, and is able to exchange various pieces of data with the data center 60. As shown in FIG. 4, the mobile terminal 50 includes a control and communication unit 52, a display unit 54 and a storage unit 56 as major components.

The data center 60 includes a server that is installed at a place remote from the vehicle. The data center 60 is outsourced for management by a vehicle maker, and handles various pieces of information. The data center 60 includes a data base 62 that stores and manages various pieces of data required for authentication.

Figure 5:
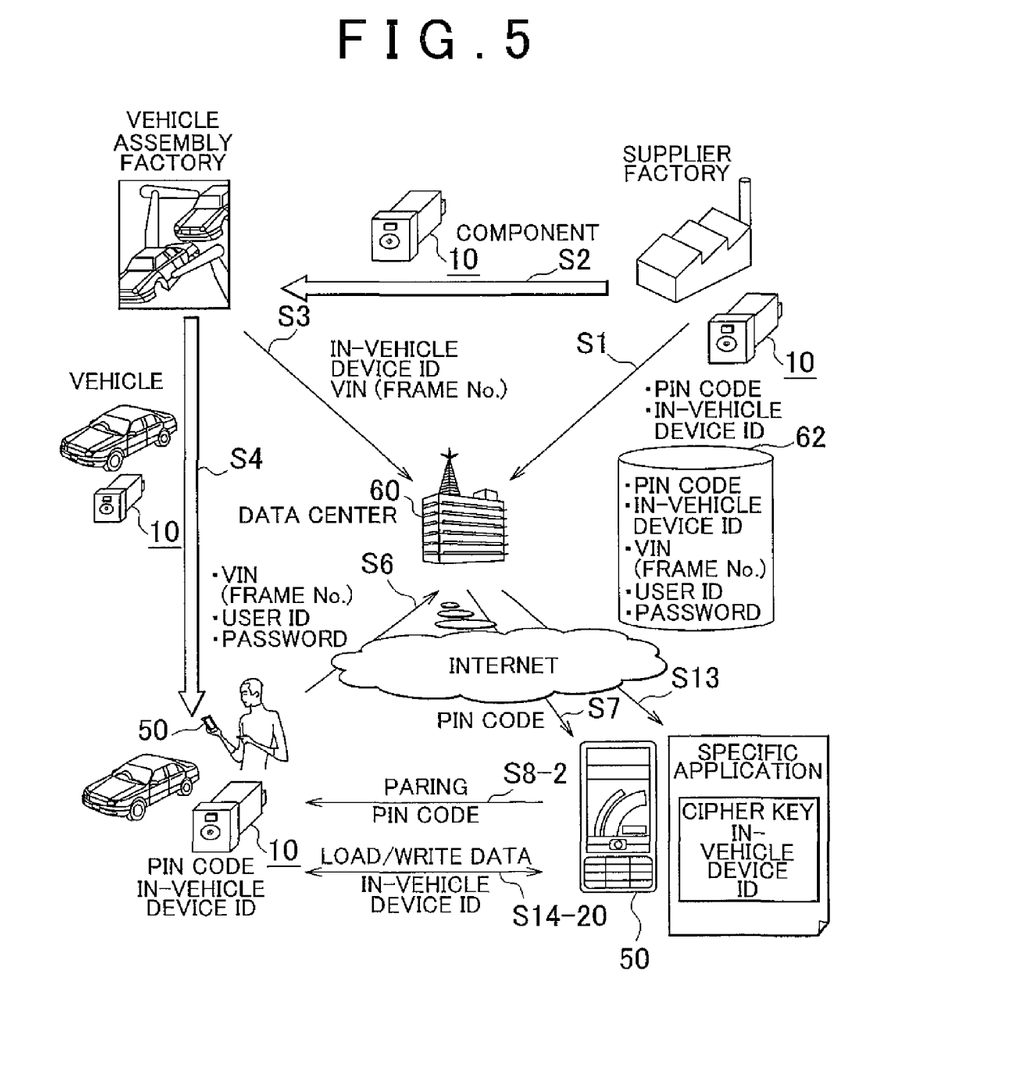
FIG. 5 is a view that shows an example of a method of constructing a vehicle authentication system according to the embodiment of the invention and an example of the operation of the vehicle authentication system.
Figure 6:
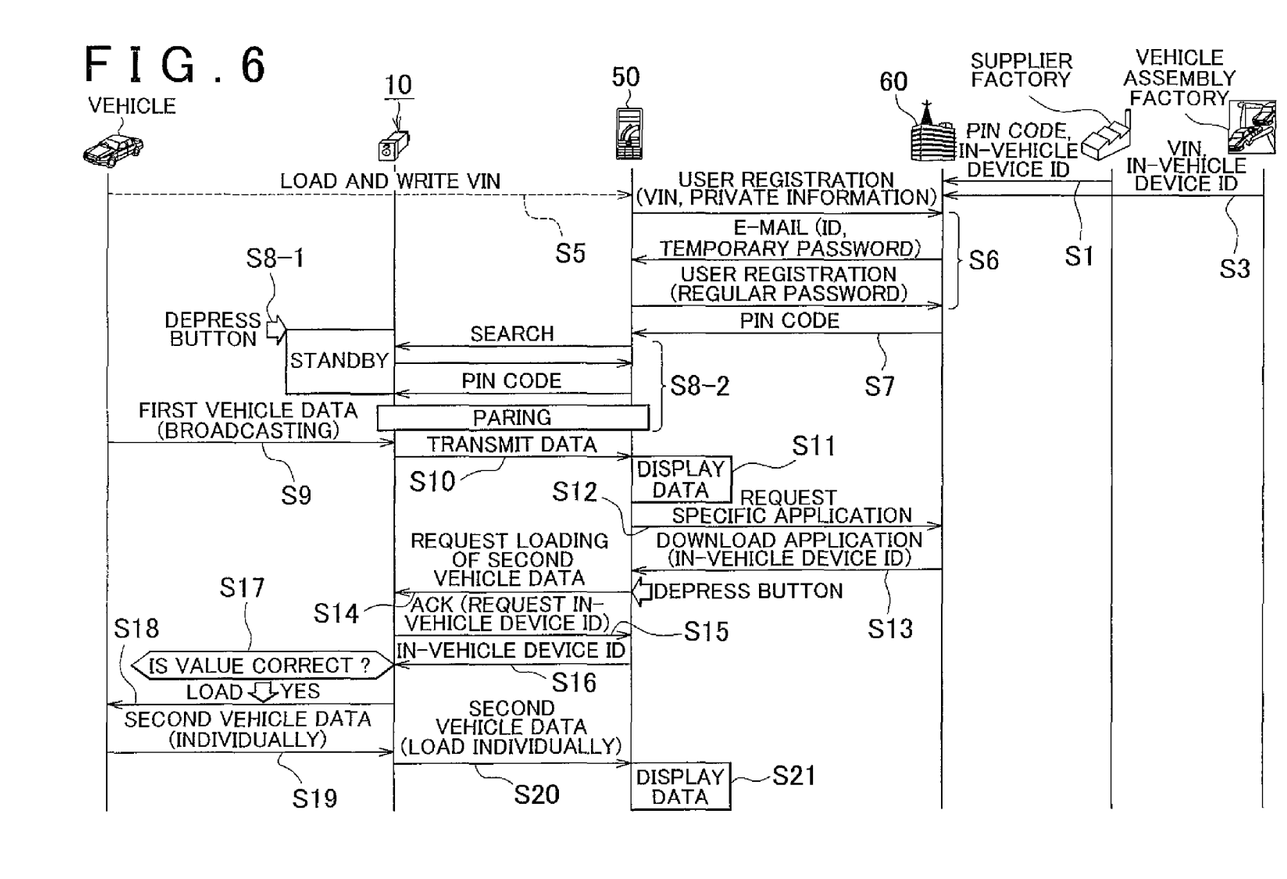
FIG. 6 is a view that shows the example of the method of constructing the vehicle authentication system according to the embodiment of the invention and the example of the operation of the vehicle authentication system.

FIG. 5 and FIG. 6 are views that show an example of a method of constructing the vehicle authentication system 1 according to the embodiment of the invention and an example of the operation of the vehicle authentication system 1.

Here, the example of the method of constructing the vehicle authentication system 1 according to the embodiment of the invention and the example of the operation of the vehicle authentication system 1 will be described with reference to FIG. 5 and FIG. 6.

In step 1, as shown in FIG. 5 and FIG. 6, at a supplier factory of the in-vehicle devices 10 (a maker of the in-vehicle devices 10), a PIN code and an in-vehicle device ID are allocated to each in-vehicle device 10, and the PIN code and in-vehicle device ID that are allocated to each in-vehicle device 10 are transmitted to the data center 60. The data center 60 stores the PIN codes and in-vehicle device IDs, transmitted from the supplier factory, in the data base 62. In addition, the PIN code and in-vehicle device ID that are generated at the supplier factory are stored in the storage unit 16 of each in-vehicle device 10. Note that the supplier factory is an example of a facility under management of the vehicle maker.

In step 2, as shown in FIG. 5, the in-vehicle device 10 is delivered from the supplier factory to a vehicle assembly factory (vehicle maker). Note that the vehicle assembly factory may be a factory that is outsourced by the vehicle maker. In addition, the supplier factory may be a factory that may be identified as the vehicle assembly factory. That is, the in-vehicle device 10 may be a product manufactured by the vehicle maker in-house.

In step 3, as shown in FIG. 5 and FIG. 6, when the in-vehicle device 10 is assembled to a vehicle, a worker of the vehicle assembly factory, for example, uses a computer in the vehicle assembly factory to transmit the in-vehicle device ID of the in-vehicle device 10 and the frame number (VIN) of the vehicle, to which the in-vehicle device 10 is assembled, to the data center 60. The data center 60 associates the VIN and the in-vehicle device ID, transmitted from the vehicle assembly factory, with each other, and stores the PIN code, the in-vehicle device ID and the VIN in the data base 62.

In step 4, as shown in FIG. 5, the completed vehicle to which the in-vehicle device 10 is assembled is delivered to a user.

In step 5, as shown in FIG. 6, the user (owner) who receives the vehicle reads the VIN of the vehicle and inputs (registers)

the VIN in the own mobile terminal 50. The control and communication unit 52 of the mobile terminal 50 stores the input VIN in the storage unit 56.

In step 6, as shown in FIG. 5 and FIG. 6, the user uses the own mobile terminal 50 to access the data center 60 and then conducts user registration. Specifically, first, as shown in FIG. 6, private information (for example, date of birth, and the like) is registered into the data center 60 together with the VIN registered in step 5. In response to this, the data center 60 transmits a user ID and a temporary password to the mobile terminal 50 of the user by e-mail. In response to this, the user uses the user ID and the temporary password to register a regular password in the data center 60. Note that the user keeps the user ID obtained in user registration and the regular password in mind.

In step 7, as shown in FIG. 5 and FIG. 6, the data center 60 extracts the PIN code, corresponding to the VIN transmitted through the user registration, from the data base 62, and transmits the extracted PIN code to the mobile terminal 50 of the user. The control and communication unit 52 of the mobile terminal 50 stores the PIN code, transmitted from the data center 60, in the storage unit 56 (see FIG. 4).

In step 8-1, as shown in FIG. 6, the user depresses the button 17*a* (see FIG. 2). As the button 17*a* is depressed, the in-vehicle device 10 is placed in a standby state for a predetermined period of time. Note that, as the button 17*a* is depressed, the control unit 12 may maintain the indicator 17*b* in an illuminated state for a predetermined period of time in order to inform the user that the in-vehicle device 10 is in a standby state.

In step 8-2, as shown in FIG. 5 and FIG. 6, when the in-vehicle device 10 is in a standby state and the mobile terminal 50 of the user is located within a range in which the mobile terminal 50 is able to wirelessly communicate with the in-vehicle device 10, for example, in the vehicle cabin, the in-vehicle device 10 and the mobile terminal 50 are paired. Specifically, as shown in FIG. 6, the mobile terminal 50 makes a search for the in-vehicle device 10. In response to this, the in-vehicle device 10 in a standby state requests the PIN code from the mobile terminal 50. In response to this, the control and communication unit 52 of the mobile terminal 50 transmits the PIN code obtained in step 7 to the in-vehicle device 10. Note that an exchange of these pieces of information for pairing is achieved by wireless communication based on Bluetooth (trademark). Subsequently, the first authentication unit 12A of the control unit 12 of the in-vehicle device 10 authenticates the mobile terminal 50 using the PIN code transmitted from the mobile terminal 50. Specifically, the first authentication unit 12A compares the PIN code transmitted from the mobile terminal 50 with the PIN code stored in the storage unit 16. When both the PIN codes coincide with each other, the first authentication unit 12A completes pairing.

Note that, even after the pairing is once completed, the first authentication unit 12A may similarly authenticate the mobile terminal 50 using the PIN code transmitted from the mobile terminal 50. In this case, authentication performed by the first authentication unit 12A may be started triggering depression of the button 17*a* in step 8-1 as in the case of the pairing; instead, authentication may be automatically started without depression of the button 17*a*.

In step 9, as shown in FIG. 6, the in-vehicle device 10 receives first vehicle data from the various in-vehicle electronic devices 30 via the in-vehicle LAN 22. The first vehicle data is data transmitted from the various in-vehicle electronic devices 30 to the in-vehicle LAN 22 by broadcasting, and may be data having a relatively low level of security. For example, the first vehicle data may be data that indicates a vehicle speed (data detected by a wheel speed sensor) or data that indicates a steering angle (data detected by a steering angle sensor). More specifically, the first vehicle data may be, for example, data required to indicate the fuel consumption (calculate the fuel consumption) of the vehicle. In this case, although it depends on a method of calculating the fuel consumption, the first vehicle data may be data relevant to a travel distance (the integral value of a vehicle speed) or a fuel injection amount.

In step 10, as shown in FIG. 6, the wireless device 14 of the in-vehicle device 10 transmits the first vehicle data, obtained from the various in-vehicle electronic devices 30, to the mobile terminal 50 by wireless communication based on Bluetooth (trademark).

In step 11, as shown in FIG. 6, the control and communication unit 52 of the mobile terminal 50 displays the first vehicle data on the display unit 54. The control and communication unit 52 of the mobile terminal 50 may display the first vehicle data as-is or may display another pieces of information converted from the first vehicle data.

In step 12, as shown in FIG. 6, the control and communication unit 52 of the mobile terminal 50 accesses the data center 60 and requests a specific application from the data center 60. The specific application may be an application that runs using second vehicle data (described later) or may be an application for loading the second vehicle data (described later). The second vehicle data, as well as the first vehicle data, is data that indicates a vehicle state; however, the second vehicle data is data having a higher level of security and confidentiality (data that requires a higher level of attention to be paid for management) than the first vehicle data. For example, the second vehicle data may be data (including diagnosis data) that indicates a failed/abnormal state of the vehicle. Note that a request for a specific application may be automatically executed by the control and communication unit 52 of the mobile terminal 50 in the stage in which connection to the in-vehicle device 10 is complete or may be executed after receiving user's approval or instructions. Note that a plurality of specific applications may be prepared in the data center 60. In this case, the user may operate the mobile terminal 50, select a desired specific application and then request the desired specific application.

In step 13, as shown in FIG. 5 and FIG. 6, the data center 60 transmits the requested specific application to the mobile terminal 50 (the mobile terminal 50 downloads the requested specific application from the data center 60). At this time, the data center 60 transmits the in-vehicle device ID stored in the data base 62 to the mobile terminal 50 together with the specific application. The in-vehicle device ID may be included in the specific application (that is, may be embedded in the specific application as a cipher key). The in-vehicle device ID is utilized as a cipher key for using the specific application on the mobile terminal 50. On the basis of information that determines the connected mobile terminal 50 (for example, at least any one of the registered VIN, the registered PIN code, the user ID, the password, and the like), the data center 60 may extract the in-vehicle device ID associated with the information (the mobile terminal 50) from the data base 62. In addition, transmission of the specific application and the in-vehicle device ID may require authentication, and, in this case, may utilize an authentication method and encryption method of secure sockets layer (SSL) or transport layer security (TLS).

Note that, in step 13, when the connected state between the data center 60 and the mobile terminal 50 via the Internet is maintained from step 6 or when the approved state of the user ID and password is maintained in the data center 60, the data center 60 may extract the associated in-vehicle device ID corresponding to the user ID and the password from the data base 62.

In step 14, as shown in FIG. 5 and FIG. 6, in response to depression of the button of the mobile terminal 50 (for example, depression of a vehicle data loading button) made by the user, the control and communication unit 52 of the mobile terminal 50 transmits a request to load the second vehicle data to the in-vehicle device 10 by wireless communication based on Bluetooth (trademark). Note that the request to load the second vehicle data may be executed by launching a specific application. That is, the request to load the second vehicle data may be executed by the function of the downloaded specific application (step 13). In addition, the request to load the second vehicle data may be automatically executed subsequently to downloading of the specific application (step 13). In addition, the request to load the second vehicle data may accompany writing of data to the in-vehicle electronic devices 30 (ECU, and the like).

In step 15, as shown in FIG. 6, as the in-vehicle device 10 receives the request to load the second vehicle data, the in-vehicle device 10 transmits an acknowledgement signal ACK to the mobile terminal 50 by wireless communication based on Bluetooth (trademark). The acknowledgement signal ACK includes a request for the in-vehicle device ID.

In step 16, as shown in FIG. 5 and FIG. 6, in response to the request for the in-vehicle device ID from the in-vehicle device 10, the control and communication unit 52 of the mobile terminal 50 transmits the in-vehicle device ID obtained in step 13 to the in-vehicle device 10 by wireless communication based on Bluetooth (trademark). Note that the in-vehicle device ID may be included in the request to load the second vehicle data in step 14 and, in this case, step 15 and step 16 may be omitted. In addition, the request to load the second vehicle data including the in-vehicle device ID may be executed by the function of the downloaded specific application (step 13).

In step 17, as shown in FIG. 6, the second authentication unit 12B of the control unit 12 of the in-vehicle device 10 authenticates the mobile terminal 50 using the in-vehicle device ID transmitted from the mobile terminal 50 in step 16. Specifically, the second authentication unit 12B compares the in-vehicle device ID transmitted from the mobile terminal 50 with the in-vehicle device ID stored in the storage unit 16. When both the in-vehicle device IDs coincide with each other, the second authentication unit 12B allows the mobile terminal 50 to load the second vehicle data.

In step 18, as shown in FIG. 6, the in-vehicle device 10 loads the second vehicle data. Specifically, the in-vehicle device 10 requests the second vehicle data from the in-vehicle electronic devices 30 via the in-vehicle LAN 22. Note that the in-vehicle device 10 may directly transmit the request to load the second vehicle data from the mobile terminal 50 (step 14) to the in-vehicle LAN 22. As described above, the second vehicle data is data having a higher level of security (confidentiality) than the first vehicle data, and may be, for example, various pieces of data (including various pieces of diagnosis data) that indicate a failed/abnormal state of the vehicle. The diagnosis data may be data detected by a sensor or data generated by the ECU on the basis of sensor information. The in-vehicle electronic devices 30 may load the required second vehicle data from its own memory and then transmit the second vehicle data to the in-vehicle LAN 22. Note that the in-vehicle device 10 may determine a requested one of the in-vehicle electronic devices 30 in response to the type of the required second vehicle data and then request the second vehicle data from the requested one of the in-vehicle electronic devices 30.

In step 19, as shown in FIG. 6, the in-vehicle device 10 receives the second vehicle data, transmitted from the in-vehicle electronic devices 30, via the in-vehicle LAN 22. The second vehicle data is desirably transmitted to the in-vehicle device 10 as individual data that specifies a destination.

In step 20, as shown in FIG. 6, the second vehicle data is individually loaded by the mobile terminal 50. Specifically, the wireless device 14 of the in-vehicle device 10 transmits the second vehicle data obtained in step 19 to the mobile terminal 50 by wireless communication based on Bluetooth (trademark). Note that the second vehicle data may be time-series data and, in this case, the second vehicle data may be transmitted to the mobile terminal 50 in real time or may be transmitted to the mobile terminal 50 collectively at an interval of a predetermined period of time.

In step 21, as shown in FIG. 6, the control and communication unit 52 of the mobile terminal 50 displays the second vehicle data on the display unit 54. The control and communication unit 52 of the mobile terminal 50 may use a specific application to directly display the second vehicle data or may display another information that is converted from the second vehicle data. By way of example of the latter case, the second vehicle data may be utilized by the specific application to be executed on the mobile terminal 50. That is, the specific application is operated by the second vehicle data.

Figure 7:
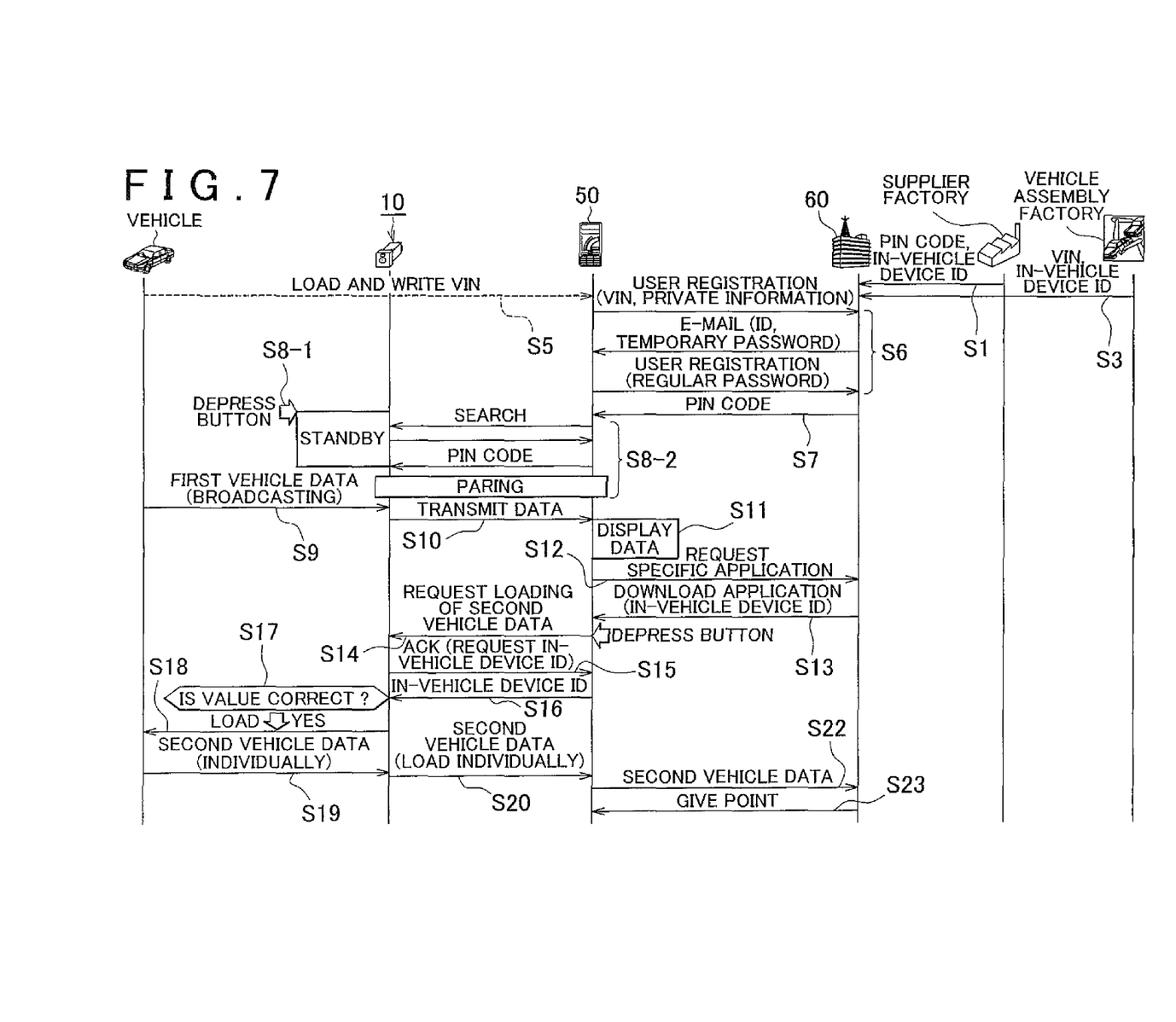
FIG. 7 is a view that shows an example of a method of constructing a vehicle authentication system according to another embodiment of the invention and an example of the operation of the vehicle authentication system.

FIG. 7 is a view that shows an example of a method of constructing the vehicle authentication system 1 according to another embodiment of the invention and an example of the vehicle authentication system 1.

The example shown in FIG. 7 mainly differs from the example shown in FIG. 6 in that the processes of step 22 and step 23 are executed instead of the process of step 21. Hereinafter, the difference will be specifically described.

In the example shown in FIG. 7, the specific application may be an application for loading the second vehicle data or may be an application for loading the second vehicle data and then transferring the loaded second vehicle data to the data center 60.

In step 22, as shown in FIG. 7, the control and communication unit 52 of the mobile terminal 50 uses the specific application to transmit (upload) the second vehicle data to the data center 60. Note that the second vehicle data may be time-series data and, in this case, the second vehicle data may be transmitted to the data center 60 in real time or may be transmitted to the data center 60 collectively at an interval of a predetermined period of time.

Step 23 may be executed selectively. In step 23, as shown in FIG. 7, the data center 60 transmits point information about a point for a transfer of the second vehicle data to the mobile terminal 50. The point may be a point that may be reduced to any interest of the user on the basis of its value (the number of points). The data center 60 may manage the point information for each mobile terminal 50 and may increase the number of points in the data base 62 by a predetermined number of points each time the second vehicle data is transferred. In addition, the point information transmitted to the mobile terminal 50 in step 23 may be information about the number of points given because of a current transfer of the second vehicle data, the number of points at the present moment, or the like. At this time, the control and communication unit 52 of the mobile terminal 50 may display the point information on the display unit 54.

With the above described vehicle authentication system 1 according to the present embodiment, particularly, the following advantageous effects are obtained.

With the vehicle authentication system 1 according to the present embodiment, as described above, when the mobile terminal 50 is wirelessly connected to the in-vehicle device 10 (and the various in-vehicle electronic devices 30 accordingly), authentication based on the PIN code is required. Then, when the second vehicle data having a high level of security is transmitted from the in-vehicle device 10 to the wirelessly connected mobile terminal 50, authentication based on the in-vehicle device ID is required. By so doing, in the configuration that allows the mobile terminal 50 to load vehicle data from the in-vehicle device 10 (and the various in-vehicle electronic devices 30 accordingly), it is possible to ensure a high level of security for the loading. Particularly, the in-vehicle device ID is kept confidential for the user (information that the user cannot know, and is generated at the vehicle maker or a facility under management of the vehicle maker, so, for example, in comparison with a cipher key that is randomly generated by the in-vehicle device 10, confidentiality (secrecy) is high and the level of security may be effectively increased.

In addition, with the vehicle authentication system 1 according to the present embodiment, for the first vehicle data having a relatively low level of security, transmission of the first vehicle data from the in-vehicle device 10 to the mobile terminal 50 is allowed when authentication based on the PIN code having a relatively low confidentiality is passed; whereas, for the second vehicle data having a relatively high level of security, transmission of the second vehicle data from the in-vehicle device 10 to the mobile terminal 50 is not allowed until authentication based on the in-vehicle device ID having a relatively high confidentiality is passed. By so doing, according to the present embodiment, the authentication method is varied depending on the level of security of vehicle data to thereby make it possible to effectively achieve both convenience and security.

The embodiments of the invention are described above; however, the aspect of the invention is not limited to the above described embodiments. Various modifications and/or replacements may be added to the above described embodiments without departing from the scope of the invention.

For example, in the above described embodiments, the specific application may be downloaded in step 12 and step 13 (see FIG. 6 and FIG. 7) for each usage or may be downloaded only for the first time. In the former case, the downloaded specific application may be cleared from the storage unit 56 of the mobile terminal 50 together with the in-vehicle device ID after the end of usage. On the other hand, in the latter case, the downloaded specific application may be held in the storage unit 56 of the mobile terminal 50 together with the in-vehicle device ID after the end of usage. In this case, in step 16, in response to the request for the in-vehicle device ID from the in-vehicle device 10, the control and communication unit 52 of the mobile terminal 50 may transmit the in-vehicle device ID held in the storage unit 56 to the in-vehicle device 10.

In addition, in the above described embodiments, both the PIN codes may be compared with each other in a selected manner. For example, the PIN code used for comparison in the first authentication unit 12A (PIN code stored in the storage unit 16) may be generated in the in-vehicle device 10 or may be generated in the mobile terminal 50. In addition, another piece of authentication information, such as a MAC address, may be utilized in addition to the PIN code.

What is claimed is:

1. An in-vehicle device that relays wireless data communication between an in-vehicle electronic device and a mobile terminal, comprising:
   a storage unit that stores a PIN code and an in-vehicle device ID that is kept confidential for a user and that is registered one for each vehicle;
   a first authentication unit that determines whether the in-vehicle device is allowed to be connected to the mobile terminal on the basis of a comparison of the PIN code;
   a second authentication unit that requests an in-vehicle device ID from the mobile terminal that has been connected through authentication performed by the first authentication unit and that authenticates the mobile terminal by comparing the in-vehicle device ID transmitted from the mobile terminal in response to the request with the in-vehicle device ID registered in the in-vehicle device, wherein the in-vehicle device ID requested from the second authentication unit is allocated to each in-vehicle device; and
   a data transmission unit that transmits predetermined vehicle data, which is obtained from the in-vehicle electronic device and which indicates a vehicle state, to the mobile terminal that has been authenticated by the second authentication unit.

2. The in-vehicle device according to claim 1, wherein the in-vehicle device ID is generated and stored in the storage unit at a vehicle maker or a facility under management of the vehicle maker.

3. The in-vehicle device according to claim 1, wherein the data transmission unit does not transmit the predetermined vehicle data but transmits vehicle data other than the predetermined vehicle data to the mobile terminal that has been connected through authentication performed by the first authentication unit and that has not been authenticated by the second authentication unit.

4. The in-vehicle device according to claim 3, wherein the predetermined vehicle data has a higher level of security than vehicle data other than the predetermined vehicle data.

5. The in-vehicle device according to claim 3, wherein the vehicle data other than the predetermined vehicle data includes at least one of data that indicates a vehicle speed, data that indicates a steering angle and data required to calculate a fuel consumption.

6. The in-vehicle device according to claim 1, wherein the predetermined vehicle data is data detected by an in-vehicle sensor or data generated on the basis of the detected data.

7. The in-vehicle device according to claim 1, wherein the predetermined vehicle data includes data that indicates a failed/abnormal state of the vehicle.

8. A vehicle authentication system comprising:
   a mobile terminal;
   an in-vehicle device that relays wireless data communication between an in-vehicle electronic device and the mobile terminal, including:
      a storage unit that stores a PIN code and an in-vehicle device ID that is kept confidential for a user and that is registered one for each vehicle;
      a first authentication unit that determines whether the in-vehicle device is allowed to be connected to the mobile terminal on the basis of a comparison of the PIN code;
      a second authentication unit that requests an in-vehicle device ID from the mobile terminal that has been connected through authentication performed by the first authentication unit and that authenticates the mobile terminal by comparing the in-vehicle device ID transmitted from the mobile terminal in response to the request with the in-vehicle device ID registered in the in-vehicle device, wherein the in-vehicle device ID requested from the second authentication unit is allocated to each in-vehicle device; and a data transmission unit that transmits predetermined vehicle data, which is obtained from the in-vehicle electronic device and which indicates a vehicle state, to the mobile terminal that has been authenticated by the second authentication unit; and a data management device that manages the in-vehicle device ID and that is managed at a vehicle maker or a facility under management of the vehicle maker, wherein the data management device is communicable with the mobile terminal and transmits the in-vehicle device ID to the mobile terminal.

9. The vehicle authentication system according to claim 8, wherein the data management device transmits the in-vehicle device ID to the mobile terminal together with an application that runs in association with the predetermined vehicle data transmitted from the in-vehicle device.

10. The vehicle authentication system according to claim 9, wherein the data management device receives the predetermined vehicle data transmitted from the mobile terminal.

11. A data communication method between an in-vehicle device and a mobile terminal, wherein the in-vehicle device stores a PIN code and an in-vehicle device ID that is kept confidential for a user and that is registered one for each vehicle, the method comprising:

in the in-vehicle device, determining whether the in-vehicle device is allowed to be connected to the mobile terminal on the basis of a comparison of the PIN code;

in the in-vehicle device, requesting an in-vehicle device ID from the mobile terminal that has been connected through authentication based on the comparison of the PIN code, wherein the requested in-vehicle device ID is allocated to each in-vehicle device;

in the in-vehicle device, authenticating the mobile terminal by comparing the in-vehicle device ID transmitted from the mobile terminal in response to the request for the in-vehicle device ID with the in-vehicle device ID registered in the in-vehicle device; and in the in-vehicle device, transmitting predetermined vehicle data, which is obtained from the vehicle equipped with the in-vehicle device and which indicates a vehicle state, to the mobile terminal that has been authenticated by a comparison of the in-vehicle device ID.

* * * * *